Figure 1:
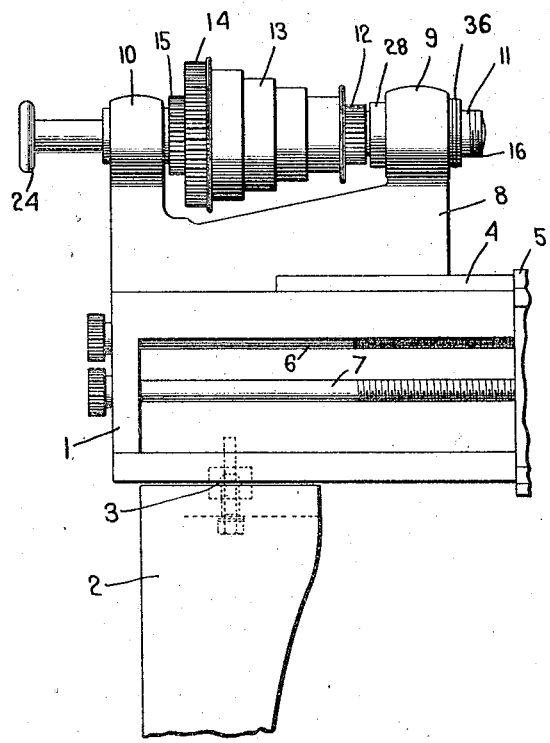

E. RIVETT.
LATHE.
APPLICATION FILED MAR. 29, 1916.

1,250,660.

Patented Dec. 18, 1917.

Inventor.
Edward Rivett,
by Heard Smith & Tennant.
Attys.

UNITED STATES PATENT OFFICE.

EDWARD RIVETT, OF NEWTON, MASSACHUSETTS.

LATHE.

1,250,660.   Specification of Letters Patent.   Patented Dec. 18, 1917.

Original application filed June 17, 1914, Serial No. 845,733. Divided and this application filed March 29, 1916. Serial No. 87,608.

*To all whom it may concern:*

Be it known that I, EDWARD RIVETT, a citizen of the United States, and resident of Newton, county of Middlesex, State of Massachusetts, have invented an Improvement in Lathes, of which the following description, in connection with the accompanying drawing, is a specification, like characters on the drawing representing like parts.

This invention relates to improvements in head stocks for lathes, grinders and like machines and the present application comprises certain features of construction disclosed in my prior application Ser. No. 845,733, filed June 17, 1914 of which it is a division.

The object of the present invention is to provide a simple and effective structure by means of which the thrust of the main shaft or live spindle of the lathe may be distributed between a plurality of bearing surfaces carried respectively by the shaft and by the bearing member or journals therefor so that binding of the shaft under unusual pressure may be avoided and wear of the bearings may be reduced.

A further object of the invention is to provide means whereby the bearing surfaces may be adjusted to compensate for wear.

Other objects of the invention will more fully appear from the following description and be particularly pointed out in the annexed claims.

Figure 2:
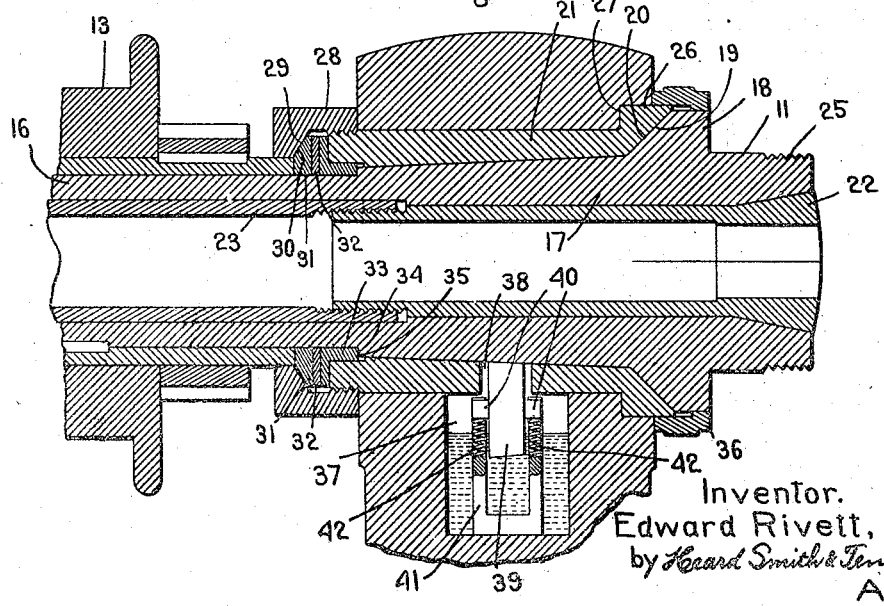

In the drawings;

Figure 1 is a side elevation of a portion of a lathe and head stock embodying this invention, and, Fig. 2 is a vertical longitudinal section through the forward bearing, that is, the one nearest the chuck or face plate end of the head stock illustrated in Fig. 1.

The lathe construction illustrated in the drawing comprises the usual lathe bed 1, supported upon legs 2 preferably connected to the lathe bed through a universal joint 3 whereby the lathe bed may be leveled readily. The lathe bed preferably is constructed with a cylindrical longitudinally extending bearing member 4 adapted to support the carriage 5 which may be moved longitudinally of the lathe bed by the usual feeding screws 6 and 7 driven in any suitable manner, the lathe bed construction preferably being such as disclosed in my prior application above referred to.

The head stock 8 preferably is cast integral with the lathe bed and is provided with upwardly extending bosses 9 and 10 which preferably overhang the cylindrical guide 4 for the carriage for the purpose set forth in my prior application although this is not essential to the present invention.

The upwardly extending bosses 9 and 10 provide journals for the main shaft 11 or live spindle of the lathe which extends centrally through said bosses and is journaled in suitable bushings therein. The main shaft or live spindle 11 may be driven by the usual gear 12 and with the cone pulley 13 and gears 14, 15 as is usual in lathes of this type, the side gears and pulley being mounted between the bosses 9 and 10.

The lathe spindle 11 preferably is in the form of a sleeve having a cylindrical portion 16 and a conoidal portion 17 provided near its inner end with an enlarged portion 18 provided with a conical face 19 preferably beveled at an angle of 45 degrees of the axis of the spindle and adapted to engage a complementary beveled face 20 upon a bushing 21 which is secured in the horizontal aperture in the bearing member or boss 9.

Within the hollow shaft or lathe spindle is mounted the usual chuck 22 which is adapted to be extended or retracted by a screw threaded sleeve 23 extending beyond the end of the main shaft and provided with the usual hand wheel 24. The main shaft or active spindle may also be provided at its inner end with a screw threaded portion 25 adapted to receive the face plate.

The spindle construction thus described is of a usual character and the present invention resides in providing a bearing preferably for the inner end of the same in which the end thrust will be so distributed as to avoid binding in the bearing and consequent wearing.

This is accomplished in the preferred embodiment of the invention illustrated herein by providing the bushing 21 with means adapted to take up a portion of the thrust of the shaft so as to relieve to any desired extent the thrust imposed upon the beveled coöperating bearing surfaces 19 and 20.

In the preferred embodiment of the invention disclosed herein the bearing 21 is provided with an annular enlarged extension 26 having a shoulder 27 engaging an annular recess in the bearing member or boss 9 said enlarged extension presenting at its end the beveled face 20 heretofore described.

The opposite end of the bushing 21 is screw threaded and provided with an internally threaded sleeve or nut 28 having a spherically concaved surface 29 adapted to engage a complementary circular surface 30 upon a disk or collar 31 which engages an anti-friction member preferably a fiber washer 32 which in turn engages a collar 33 connected to the shaft.

The collar 33 preferably is provided with a cylindrical portion 34 adapted to fit upon the cylindrical portion 16 of the main shaft 11 and to abut against a shoulder 35 at the division between the cylindrical portion 16 and the conical end 17 of the main shaft. The collar 33 is provided with a laterally annular flange which engages the disk 32 in the manner aforesaid.

It will be obvious that the collar 28 may be adjusted upon the portion 21 in such a manner as to bring any desired pressure upon the spherical bearing surface 29 and that it may be so adjusted that a portion of the longitudinal thrust of the main shaft will be sustained by the bearing 29 and the thrust between the conical surface 19 and 20 thereby relieved.

The adjustability of the collar 28 also provides a means for taking up such wear as may occur in the bearing. The joint which occurs between the enlarged end portion 26 of the bushing 21 and the enlarged portion 18 of the spindle may conveniently be covered by an annular dust protecting cap 36 which may be secured either to the rotating spindle or to the bushing as may be convenient.

Any suitable means may be provided for lubricating the bearing shown herein. A convenient means which is illustrated herein comprises a well 37 in the head 8 communicating through an aperture 38 with the spindle 11 preferably midway of the boss 9. Oil is supplied to the wheel from any suitable reservoir not shown and is discharged therefrom upon the spindle 11 by a cylindrical member 39 rotatably supported in journals 40 which are slidably mounted in ways in a bracket 41 secured to the walls of said wheel. Springs 42 seated at their base on the bracket and at their upper end supporting the journals 40 of said cylinder serve to hold the cylinder in contact with the rotating spindle and by reason of the fact that the lower portion of the wheel 40 is submerged in lubricant the lubricant is transferred to the shaft constantly. Any superfluous oil returns to the wheel so that there is no waste of oil at the bearing.

By reason of the fact that the bushing 21 is relatively short, extending only through the inner bearing member 9 of the head the expansion and contraction of the bushing is relatively small so that the end thrust may be successively distributed between the bearing members aforesaid whereas if the bushing were relatively long the expansion and contraction might be such as to destroy the effectiveness of the distribution of thrust or in fact under contraction to impose an additional amount of thrust upon the relatively movable parts of the bearing.

It is to be understood that the construction shown and described herein is illustrative and not restrictive and that other embodiments of the invention may be made within the spirit and scope of the following claims.

Having thus described my invention what I claim as new and desire to secure by Letters Patent is;

1. In a head stock for lathes having a plurality of bearing members, a bushing seated in one of said members extending therethrough and having at its inner end a conoidal bearing surface and at its outer end an internally flanged adjustable nut, a spindle rotatably mounted in said bushing having a conoidal surface engaging the conoidal surface of said bushing and a collar adapted to coöperate with the internal flange of the nut upon said bushing to relieve the conoidal surface of a portion of the end thrust of said shaft.

2. In a lathe, a head stock comprising a bearing member, a bushing seated therein, a shaft having an enlarged end rotatably mounted in said bushing and bearing upon the end thereof, means for relieving the thrust of the shaft upon the end bearing surface of said bushing comprising a nut having internal screw threads engaging the screw threads upon said bushing, an internal flange presenting a spherical concaved surface, means carried by said shaft and prevented from longitudinal movement thereon having a complementary convex face engaging the spherical surface of said nut.

3. In a lathe, a head stock comprising a bearing, a bushing seated therein having a conical bore and a conically beveled end portion, a shaft rotatably mounted in said bushing and having a thickened wall corresponding to the contour of the bore and the conically beveled end portion of the bush, a nut having an internal flange adjustably secured to said bushing, a collar fixed upon said shaft adapted to coöperate with the annular flange of said nut and an anti-friction member intermediate of said collar and the flange upon said nut.

4. In a lathe, a head stock comprising a bearing member, a bushing seated therein, a shaft having an enlarged end rotatably mounted in said bushing and bearing upon the end thereof, means for relieving the thrust of the shaft upon the end surface of said bushing comprising an internally flanged nut adjustably mounted upon the opposite end of said bushing, a disk rotatably mounted upon said shaft within said nut and a collar fixedly secured to said shaft adapted to coöperate with said disk whereby a portion of the end thrust of the shaft will be absorbed by the bushing through said disk and nut.

5. In a lathe, a head stock comprising a bearing member, a bushing seated therein, a shaft having an enlarged end rotatably mounted in said bushing and bearing upon the end thereof, means for relieving the thrust of the shaft upon the end surface of said bushing comprising an internally threaded nut having a spherical concaved internal flange, a disk rotatably mounted upon said shaft having a spherical surface coöperatively engaging the concaved spherical surface of said nut, an anti-friction member engaging said disk and a collar fixedly secured upon said shaft engaging said anti-friction member.

6. In a lathe, a main shaft comprising a cylindrical portion and a conoidal portion having an enlarged end and a conically beveled bearing surface, a bearing for said shaft comprising a bearing member, a bushing seated therein having at its end a conoidal bearing surface adapted to coöperate with the conoidal bearing surface of said shaft and at its opposite end an adjustable internally flanged nut, a disk rotatably mounted upon the cylindrical portion of said shaft, a collar fixedly secured to the cylindrical portion of said shaft and abutting against an annular shoulder on said shaft and an anti-friction member intermediate of said disk and said collar.

In testimony whereof, I have signed my name to this specification.

EDWARD RIVETT.

Copies of this patent may be obtained for five cents each, by addressing the "Commissioner of Patents, Washington, D. C."